United States Patent
Schwalbe

(10) Patent No.: US 7,422,393 B2
(45) Date of Patent: *Sep. 9, 2008

(54) AEROBIC AND ANAEROBIC WASTE MANAGEMENT SYSTEMS AND METHODS FOR LANDFILLS

(75) Inventor: John Schwalbe, Rutland, VT (US)

(73) Assignee: Casella Waste Systems, Inc., Ruthland, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/698,021

(22) Filed: Jan. 26, 2007

(65) Prior Publication Data

US 2007/0189856 A1    Aug. 16, 2007

Related U.S. Application Data

(63) Continuation-in-part of application No. 11/098,426, filed on Apr. 5, 2005, now Pat. No. 7,168,888.

(51) Int. Cl.
*B09B 5/00* (2006.01)
(52) U.S. Cl. .............................. 405/129.95; 405/129.85
(58) Field of Classification Search ............ 405/129.57, 405/129.7, 129.85, 129.95
See application file for complete search history.

(56) References Cited

U.S. PATENT DOCUMENTS

| | | |
|---|---|---|
| 3,941,556 A | 3/1976 | Pallagi |
| 4,650,367 A | 3/1987 | Dietzler |
| 5,605,417 A | 2/1997 | Englert et al. |
| 5,857,807 A | 1/1999 | Longo, Sr. |
| 6,283,676 B1 | 9/2001 | Hater et al. |
| 6,334,737 B1 | 1/2002 | Lee et al. |
| 6,364,572 B1 | 4/2002 | Hudgins et al. |
| 6,481,929 B1 | 11/2002 | Layton et al. |
| 6,599,058 B1 | 7/2003 | Arnold |
| 6,742,962 B2 | 6/2004 | Hater et al. |
| 7,168,888 B2 * | 1/2007 | Schwalbe ............... 405/129.95 |
| 2004/0191755 A1 | 9/2004 | Kemper et al. |
| 2005/0111918 A1 * | 5/2005 | Yeager .................. 405/129.85 |

* cited by examiner

*Primary Examiner*—John Kreck
(74) *Attorney, Agent, or Firm*—Wilmer Cutler Pickering Hale and Dorr LLP

(57) ABSTRACT

Embodiments of the invention provide systems and methods for creating, managing and staging aerobic and/or anaerobic landfills. Embodiments of the invention provide systems and methods for collecting liquids from and recirculating liquids into landfills and systems and methods for collecting gases from and introducing gases into landfills. Embodiments of the invention also provide a novel conduit for conveying liquids and gases which comprises a first pipe coaxially disposed within a second pipe.

17 Claims, 9 Drawing Sheets

AEROBIC AND ANAEROBIC WASTE MANAGEMENT SYSTEMS AND METHODS FOR LANDFILLS

CROSS-REFERENCE TO RELATED APPLICATION

This application is a continuation-in-part of U.S. application Ser. No. 11/098,426 entitled AEROBIC AND ANAEROBIC WASTE MANAGEMENT SYSTEMS AND METHODS FOR LANDFILLS, filed on Apr. 5, 2005, now U.S. Pat. No. 7,168,888.

FIELD OF THE INVENTION

The invention provides systems and methods for creating, managing and staging aerobic and/or anaerobic landfills. The invention provides systems and methods for collecting liquids from and recirculating liquids into landfills and systems and methods for collecting gases from and introducing gases into landfills. The systems and methods of the invention can be retrofit into existing landfills or they can be used in new landfill construction.

BACKGROUND OF THE INVENTION

The recovery of landfill gases including light hydrocarbons such as methane has become commonplace and is regulated under New Source Pollution Standards (NSPS). It used to be common to burn gasses vented from landfills. It is, however, becoming more common to use landfill gases to generate heat and/or electricity. Prior methods have resulted in increased costs and risks associated with managing gases and liquids in landfills.

Landfill leachate, the aqueous solution that accumulates at the bottom of landfills, also poses disposal and odor problems. One method for dealing with leachate odor problems that is gaining wide acceptance is to pump the leachate from the bottom to the top of the landfill to allow the leachate to percolate though the landfill where moisture and biological material in the leachate provide the foundation blocks (e.g., sources of moisture and nutrition) for microorganisms that will ultimately remediate and stabilize the landfill. The normal biological degradation of organic landfill materials can be dramatically accelerated by being able to cost effectively control the moisture and aerobic/anaerobic environments within and landfill resulting in the recycling or creation of more landfill airspace, thereby extending the useful landfill life.

The combination of leachate recirculation and gas extraction in landfills has created a problem with gas extraction, well flooding, fouling and effective control of the aerobic vs. anaerobic phases within a landfill. Prior attempts have resulted in systems that increase the overall costs of disposing of waste by as much as one hundred percent. In addition, prior methods introduced unnecessary risks associated with odor generation and liquid management. There is a need in the art for landfill gas extraction and leachate circulation that are easier and cheaper to construct while controlling the inner landfill environment more effectively. The invention is directed to this, as well as other, important ends.

SUMMARY OF THE INVENTION

Under Subtitle D of the Resource Conservation and Recovery Act (RCRA), sanitary landfills operate under the dry tomb landfill technology. The dry tomb technology is characterized by landfill cover and liner systems that are designed to minimize infiltration of liquids into the landfill and prevent leakage and seeps into the surrounding environment. As waste generation continues to grow faster than population, and permitting new landfills and landfill expansions is becoming increasingly more difficult and more expensive, leaders in municipal solid waste services must respond to the challenges of maximizing disposal capacity.

It is widely accepted that introduction of liquids (e.g., leachate, gas condensate, non-hazardous liquid wastes, storm water, surface water, groundwater) into a landfill accelerates the degradation of the organic fraction of solid waste compared to the dry tomb method. Faster anaerobic degradation of the organic waste results in an increase in landfill gas production and a subsequent rapid settlement of the waste. Rapid settlement of the waste results in increased effective waste density and recaptured landfill air space. With the proper management of liquids in the landfill, it is estimated that the amount of air space in a landfill that may be recaptured is in the range of about 15% to about 30%. The ability to reuse the air space gained from waste settlement may also reduce the total land area required to host new or expanded landfills. The resulting increase in the amount of waste that can be disposed of also results in an increase of the amount of gas as well as gas production that can be economically recovered for beneficial uses and control of emissions.

This invention solves numerous problems typically associated with "wet" landfills including: increasing efficient management of fugitive emissions; increasing airspace in landfills as a result of waste settlement; reducing investment and operating costs for leachate recirculation and liquid introduction; reducing leachate toxicity and costs associated with off-site treatments of leachate; reducing ammonia-nitrogen concentration build up from anaerobic leachate recirculation; reducing total nitrogen content of leachate if the upper layers of the landfill are aerated as the leachate is recirculated; providing new sources of revenue by managing large volumes of liquids (e.g., liquid wastes); increasing landfill densities by using liquid wastes because the liquid wastes do not occupy volume in landfills but create volume (e.g., airspace) by rapidly degrading solid waste; enhancing gas production by eliminating potential for ammonia toxicity; reducing leachate and liquid seeps and the resulting contamination; improving slide-slope stability of landfills, allowing for increased height of the waste and reducing the footprint of landfills; increasing waste stabilization, which increases effective waste density and allows for recapture of airspace; optimizing production and recovery of landfill gases; reducing greenhouse gas emissions; mitigating effects of cold weather on waste degradation by introducing air into landfills and increasing the temperature in the waste; reducing the need for new landfills or expansion of existing landfills; expanding and/or increasing the life of landfills; and reducing the post-closure care period of landfills to allow for potential beneficial alternative uses of landfill properties for public or commercial purposes.

In one embodiment, the invention provides waste management systems for landfills comprising a relatively vertical pipe that extends at least 2 feet above the top of the landfill and that passes through at least: (a) a first layer of waste; (b) a first area located beneath the first layer of waste; wherein the first area comprises at least one filler material; (c) a second layer of waste beneath the first area; and (d) a second area beneath the second layer of waste; wherein the second area comprises at least one filler material; wherein the relatively vertical pipe ends in the second area; and wherein the relatively vertical pipe comprises perforations in the first area and the second area. The relatively vertical pipe may comprise a first tube coaxially disposed within a second tube; wherein the second tube comprise perforations in the first area and the second area. In one embodiment, the first area and the second area are less than 2 feet deep. The filler material, which has a higher permeability to gases and/or liquids than the waste, may be tire chips, glass cullet, stone, gravel, sand, concrete waste, stone waste, construction waste, a geotextile, or a combination of two or more thereof. The vertical pipe may pass through the second area and end at least 5 feet into a third layer of waste beneath the second area. The first area and the second area may have a size that is from about 5 feet by about 5 feet to about 50 feet by about 50 feet. In one embodiment, (b) and/or (d) comprises a layer of waste which comprises the first area. In another embodiment, the system further comprises a relatively horizontal perforated pipe that extends through the first area; and a relatively horizontal perforated pipe that extends through the second area. The invention provides method for aerobically managing a landfill comprising the waste management system by performing one or more of the following steps in any order: (i) adding one or more liquids to the relatively vertical pipe; (ii) removing leachate from the relatively vertical pipe; and (iii) adding one or more gases to the relatively vertical pipe. In one embodiment, steps (i) and (iii) are performed alternately or simultaneously. In another embodiment, steps (ii) and (iii) are performed alternately or simultaneously. The invention provides methods for anaerobically managing a landfill comprising the waste management system by performing one or more of the following steps in any order: (i) adding one or more liquids to the relatively vertical pipe; (ii) removing leachate from the relatively vertical pipe; and (iii) removing biogas from the relatively vertical pipe. In one embodiment, steps (i) and (iii) are performed alternately or simultaneously. In another embodiment, steps (ii) and (iii) are performed alternately or simultaneously. The invention also provides methods for retrofitting existing landfills by drilling the relatively vertical pipe described herein into an existing landfill.

In another embodiment, the invention provides methods for making waste management systems comprising: (a) providing a first layer of waste; (b) providing a second layer of waste which comprises a plurality of areas that comprise at least one filler material; (c) providing a third layer of waste; (d) providing a fourth layer of waste which comprises a plurality of areas that comprise at least one filler material; (e) providing a fifth layer of waste; and (f) drilling one or more pipes that extend through (e); one or more of the plurality of areas in (d); (c); one or more of the plurality of areas in (b); and at least 5 feet into (a); wherein the pipe comprises perforations in (d) and (b). The filler material, which has a higher permeability to gases and/or liquids than the waste, may be tire chips, glass cullet, stone, gravel, sand, concrete waste, stone waste, construction waste, a geotextile, or a combination of two or more thereof. In one embodiment, the relatively vertical pipe comprise a first tube coaxially disposed within a second tube; wherein the second tube comprise perforations in one or more areas in (d) and one or more areas in (b). The methods may further comprise providing a relatively horizontal pipe in the second layer of waste and the fourth layer of waste; wherein the relatively horizontal pipe comprises perforations where it passes through the plurality of areas that comprise at least one filler material. In another embodiment, the methods may further comprise drilling one or more pipes that extend through (e); one or more of the plurality of areas in (d) and, optionally, the relatively horizontal pipe; (c); one or more of the plurality of areas in (b) and, optionally, the relatively horizontal pipe; and at least 5 feet into (a); wherein the pipe comprises perforations in (d) and (b). The invention provides method for aerobically managing a landfill comprising the waste management system by performing one or more of the following steps in any order: (i) adding one or more liquids to the relatively vertical pipe; (ii) removing leachate from the relatively vertical pipe; and (iii) adding one or more gases to the relatively vertical pipe. In one embodiment, steps (i) and (iii) are performed alternately or simultaneously. In another embodiment, steps (ii) and (iii) are performed alternately or simultaneously. The invention provides methods for anaerobically managing a landfill comprising the waste management system by performing one or more of the following steps in any order: (i) adding one or more liquids to the relatively vertical pipe; (ii) removing leachate from the relatively vertical pipe; and (iii) removing biogas from the relatively vertical pipe. In one embodiment, steps (i) and (iii) are performed alternately or simultaneously. In another embodiment, steps (ii) and (iii) are performed alternately or simultaneously. The invention also provides methods for retrofitting existing landfills by drilling the relatively vertical pipe described herein into an existing landfill.

In another embodiment, the invention provides waste management systems for landfills comprising: (a) a first layer of waste; (b) a second layer of waste that comprises at least one relatively horizontal pipe; wherein one or more portions of the relatively horizontal pipe is surrounded by a filler material that has a higher permeability than the waste; and wherein the one or more portions of the relatively horizontal pipe comprises perforations when surrounded by the filler material; (c) a third layer of waste; (d) wherein the at least one relatively horizontal pipe extends near the edge of the landfill and is connected to a first pipe that exits at the side of the landfill. The filler material, which has a higher permeability to gases and/or liquids than the waste, may be tire chips, glass cullet, stone, gravel, sand, concrete waste, stone waste, construction waste, a geotextile, or a combination of two or more thereof. In one embodiment, the relatively horizontal pipe is alternately surrounded by a first filler material and a second filler material; wherein the first filler material and the second filler material are different; where the alternating second filler material are located at least 10 feet apart; and wherein the first filler material and the second filler material have a higher permeability than the waste. In one embodiment, the first pipe extends at least 5 feet beyond and below the point where the first pipe connects with the relatively horizontal pipe; and wherein the first pipe optionally comprises a U trap. The invention also provides methods for aerobically or anaerobically managing a landfill comprising the waste management system which comprises one or more of the following steps: (i) removing leachate from the first pipe; (ii) adding liquid to the first pipe; (iii) removing biogas from the first pipe; and (iv) adding air to the first pipe.

Embodiments of the invention provide methods for making a waste management system for a landfill comprising: (i) providing a first layer of waste; (ii) providing at least one row comprising at least one filler material on the first layer of waste; (iii) providing a single perforated pipe in the at least one row comprising the filler material; (iv) covering the single pipe in the at least one row with filler material; and (v) providing a second layer of waste. The filler material, which has a higher permeability to gases and/or liquids than the waste, may be tire chips, glass cullet, stone, gravel, sand, concrete waste, stone waste, construction waste, a geotextile, or a combination of two or more thereof. In one embodiment, the at least one row is more than 25 feet wide. The methods may further comprise connecting the single perforated pipe to a second pipe that exits the landfill from the side.

Embodiments of the invention provide landfills comprising: (i) waste; (ii) a plurality of flux units distributed in a relatively horizontal matrix and/or a relatively vertical matrix; wherein each flux unit comprises at least one pipe which comprises perforations; wherein each pipe is surrounded by a filler material; wherein each flux unit is located at least 10 feet away from an adjacent flux unit in the relatively horizontal and/or relatively vertical direction; and (iii) a plurality of pipes connected to the pipes in the flux units; wherein the plurality of pipes connect the plurality of flux units in the relatively horizontal and/or relatively vertical matrix. The filler material, which has a higher permeability to gases and/or liquids than the waste, may be tire chips, glass cullet, stone, gravel, sand, concrete waste, stone waste, construction waste, a geotextile, or a combination of two or more thereof. The flux units are influx and/or efflux units that provide for the influx and/or efflux of liquids and/or gases from the perforations in the at least one pipe.

In another embodiment of the invention, a landfill is provide that includes waste, and a plurality of interconnected flux units distributed in a relatively horizontal matrix and/or a relatively vertical matrix. Each flux unit includes at least two pipes, each of which includes perforations and are surrounded by a filler material. At least one flux unit has a substantially U-shaped portion. At least a first end of the substantially U-shaped portion extends vertically below the at least two pipes of the at least one flux unit and is operably communicative with at least one of the at least two pipes of the at least one flux unit. A flux unit also includes a plurality of non-perforated pipes connected to the plurality of perforated pipes. The plurality of non-perforated pipes connect at least a first flux unit and a second flux unit in the relatively horizontal and/or relatively vertical matrix, and a relatively vertical pipe is operably communicative with a second end of the U-shaped portion.

In other embodiments of the present invention, the relatively vertical pipe is capable of removing liquids from the landfill and is capable of injecting liquids into the landfill. The relatively vertical pipe is also capable of removing gases from the landfill while injecting liquids into the landfill. Each flux unit may be located at least 10 feet away from an adjacent flux unit in the relatively horizontal and/or relatively vertical direction.

The invention is described in more detail herein.

BRIEF DESCRIPTION OF THE FIGURES

FIG. 2 shows relatively horizontal pipes in communication with relatively vertical pipes as depicted in FIG. 1A; however, one skilled in the art will appreciate that the relationship between the relatively vertical pipes and the relatively horizontal pipes can alternatively be that shown in FIG. 1D, or can be any combination of the relationships shown in FIGS. 1A and 1D.

DETAILED DESCRIPTION OF THE INVENTION

Figure 1A:
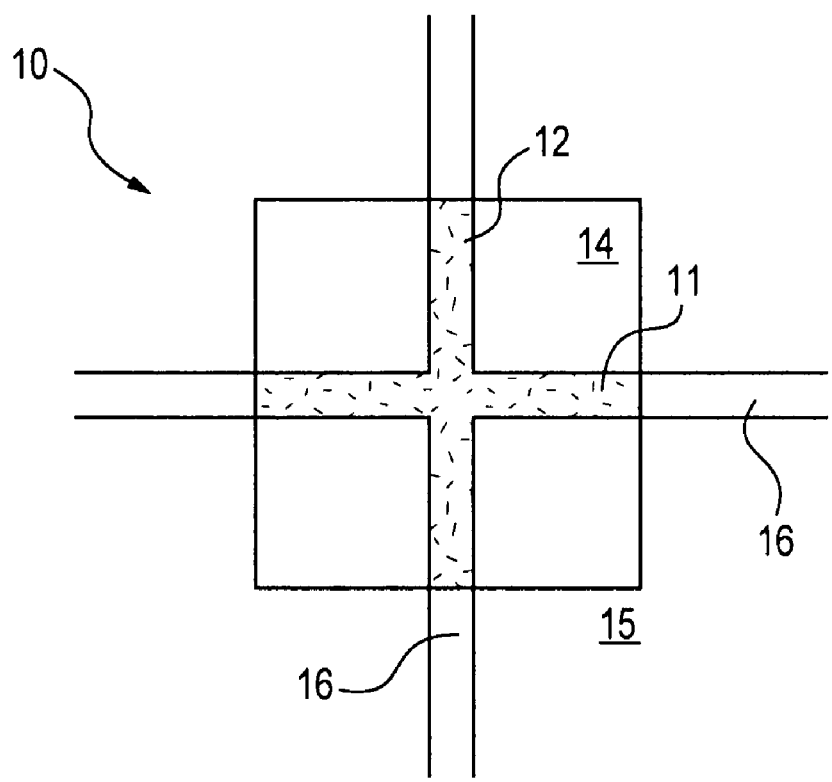
FIG. 1A shows a cross-sectional view of one embodiment of a flux unit of the invention where a relatively horizontal pipe is in communication with a relatively vertical pipe.

The invention provides systems and methods for creating, managing and staging aerobic and/or anaerobic landfills. The invention provides methods for collecting liquids from and recirculating liquids into landfills and methods for collecting gases from and introducing gases into landfills.

Liquids may be applied to landfills on a continuous or an intermittent basis in order to maintain the landfill moisture content in a range from about 20 wt % to about 65 wt %; or from about 35 wt % to about 55 wt %. In arid regions, moisture can typically only be increased from about 10 wt % to about 20 wt % because the starting waste moisture content is very low. The moisture content of the waste can lie outside this range depending upon the moisture holding capacity of the waste and the purpose for adding liquid to the landfill. In one embodiment, liquids are added to the landfill in an amount of about 10,000 to about 20,000 gallons/day for each 1,000 tons/day of waste brought into the landfill. Additional liquids may be added based on measurements of waste moisture content and availability of gases. There are several reasons for adding liquids to active landfills. Liquids can be added to landfills in order to facilitate landfill aerobic or anaerobic bioremediation. In addition, liquids, such as leachate, may be added to landfills in order to remove unwanted inorganic materials from the leachate. As the leachate percolates through the landfill, anaerobic or aerobic microorganisms and bacteria consume organic materials in the leachate, thereby remediating the recirculated leachate.

"Liquids" refers to any water including, for example, leachate, storm water, ground water, surface water, gas condensate, fresh water, non-hazardous waste water (e.g., ink waste, liquid food waste), and combinations of two or more thereof.

Gases (e.g., biogas, methane) may be collected from landfills, generally under anaerobic conditions. Gases (e.g., air, oxygen, nitrogen) may be added to landfills, generally creating aerobic conditions within the landfill. "Gases" refers to any gas including, for example, biogas, methane, air, oxygen, nitrogen and the like. Biogas, a renewable fuel, is generated when bacteria degrade biological material in the absence of oxygen in a process known as anaerobic digestion. Biogas generally comprises about 25% to about 95% methane. In another embodiment, biogas comprises about 40% to about 90% methane; about 10% to about 60% carbon dioxide; 0% to about 10% nitrogen; 0 to 3% hydrogen; and 0 to 2% oxygen. One skilled in the art will appreciate that biogas may contain other impurities such as solids and liquids. The liquids are generally in the form of condensate when the biogas cools.

The landfills of the invention comprise "waste," such as municipal solid waste. "Municipal solid waste" means solid waste typically collected as part of a municipal garbage collection system and typically includes in combination household wastes, food wastes, lawn wastes, office generated waste and may further include amounts of industrial generated wastes and scrap material. Municipal solid waste is further intended to include bio-solids and sludges recovered from sewage treatment plants. The term municipal solid waste may also include mixed wastes, such as typical unseparated household waste and source separated wastes such as organics generated by sewage treatment plants and food wastes generated by restaurants and food processing facilities.

In one embodiment, the invention provides flux units. The term "flux unit" is intended to mean a unit that simultaneously or sequentially (i) allows for the influx of gases and/or liquids and (ii) allows for the efflux of gases and/or liquids. Accordingly, a "flux unit" may be a liquid influx unit, a liquid efflux unit, a gas influx unit, a gas efflux unit, or a combination of two or more thereof.

The flux units comprise (i) at least one pipe which comprises perforations and (ii) a leachate field surrounding the pipe. At least a portion of the pipe is perforated in a manner sufficient to allow the influx and/or efflux of liquids and/or gases. In one embodiment, the pipe is perforated along its entire length within the flux unit. In another embodiment, the pipe is partially perforated along one or more portions of its length within the flux unit.

FIG. 1A shows a cross-sectional view of one embodiment of a flux unit. The flux unit 10 comprises a relatively horizontal perforated pipe 11 and a relatively vertical perforated pipe 12, both of which are substantially surrounded by a leachate field 14. The flux unit 10 may be surrounded by waste 15. The relatively horizontal perforated pipe 11 and the relatively vertical perforated pipe 12 within the flux unit 10 are connected to relatively vertical or relatively horizontal transport pipes 16 that are located outside the flux unit. The connection between the perforated pipe 11, 12 and the transport pipe 16 may occur within the flux unit 10, at the boundary between the flux unit 10 and the waste 15; or within the waste 15. In one embodiment, the connection between the perforated pipe 11, 12 and the transport pipe 16 occurs within the flux unit 10 or at the boundary between the flux unit 10 and the waste 15.

Figure 1B:
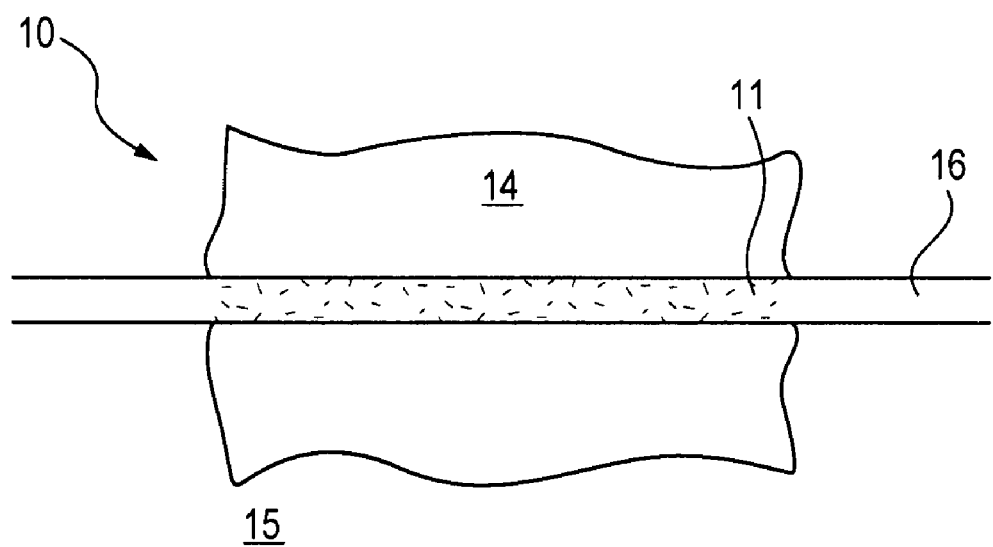
FIG. 1B shows a cross-sectional view of one embodiment of a flux unit of the invention comprising a relatively horizontal pipe.

FIG. 1B shows a cross-sectional view of another embodiment of a flux unit. The flux unit 10 comprises a relatively horizontal perforated pipe 11 which is substantially surrounded by a leachate field 14. The flux unit 10 may be surrounded by waste 15. The relatively horizontal perforated pipe 11 within the flux unit 10 is connected to relatively horizontal transport pipe 16 that is located outside the flux unit. The connection between the perforated pipe 11 and the transport pipe 16 may occur within the flux unit 10, at the boundary between the flux unit 10 and the waste 15; or within the waste 15. In one embodiment, the connection between the perforated pipe 11 and the transport pipe 16 occurs within the flux unit 10 or at the boundary between the flux unit 10 and the waste 15.

Figure 1C:
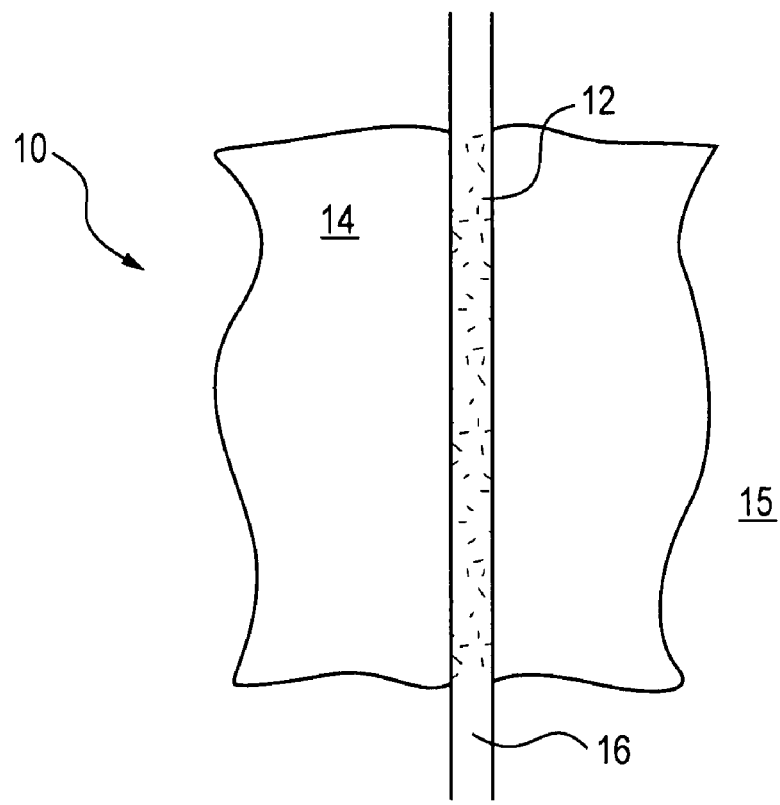
FIG. 1C shows a cross-sectional view of one embodiment of a flux unit of the invention comprising a relatively horizontal pipe.
Figure 1D:
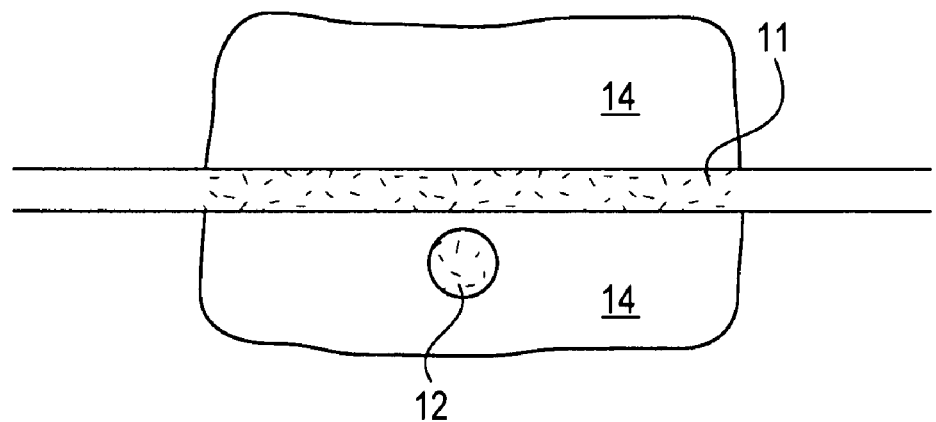
FIG. 1D shows an aerial, cross-sectional view of one embodiment of a flux unit of the invention where a relatively horizontal pipe passes through the leachate field in the flux unit, and a relatively vertical pipe passes through the leachate field in the flux unit, but where the relatively horizontal pipe is not in communication with the relatively vertical pipe.

FIG. 1C shows a cross-sectional view of another embodiment of a flux unit. The flux unit 10 comprises a relatively vertical perforated pipe 12 which is substantially surrounded by a leachate field 14. The flux unit 10 may be surrounded by waste 15. The relatively vertical perforated pipe 11 within the flux unit 10 is connected to relatively vertical transport pipe 16 that is located outside the flux unit. The connection between the perforated pipe 12 and the transport pipe 16 may occur within the flux unit 10, at the boundary between the flux unit 10 and the waste 15; or within the waste 15. In one embodiment, the connection between the perforated pipe 12 and the transport pipe 16 occurs within the flux unit 10 or at the boundary between the flux unit 10 and the waste 15.

Figure 1E:
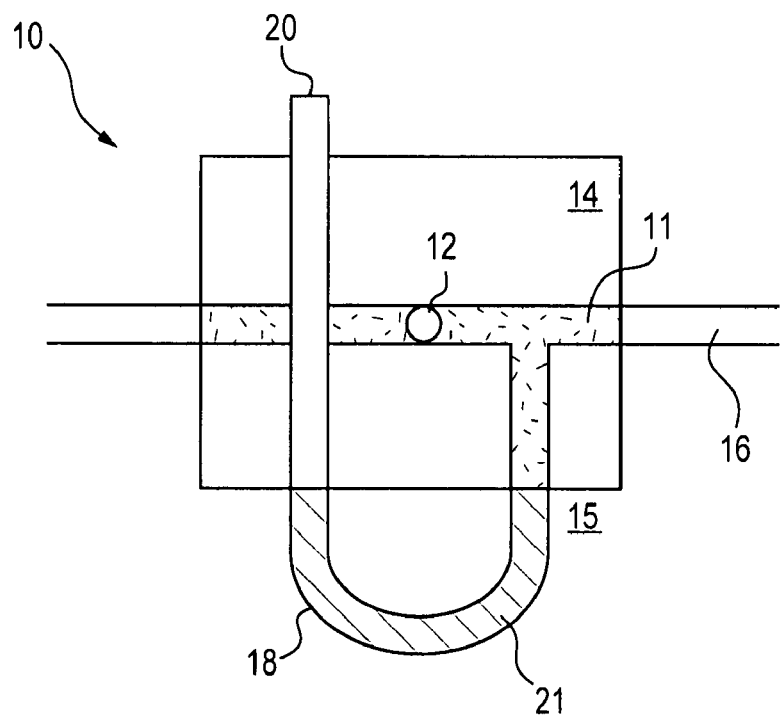
FIG. 1E shows a cross-sectional view of one embodiment of a flux unit of the invention where a relatively vertical pipe is in communication with a relatively horizontal pipe that is partially perforated and in communication with a U-shaped portion.
Figure 1F:
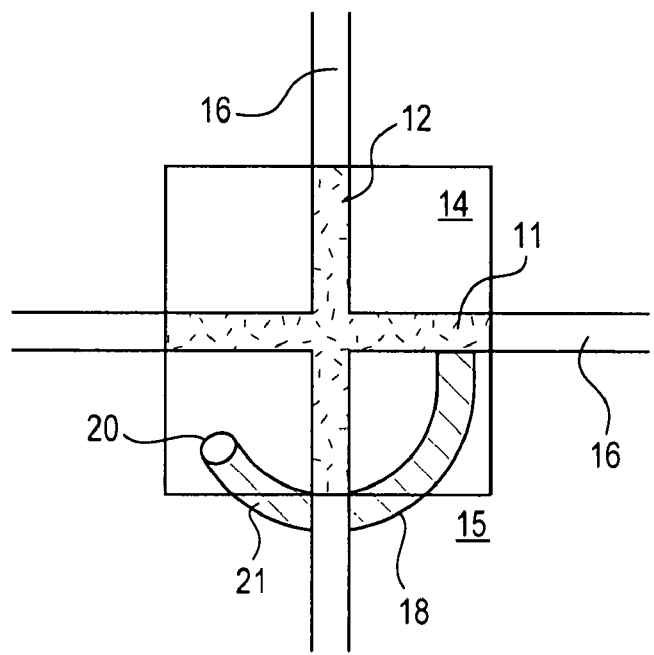
FIG. 1F shows a top view of FIG. 1E.

FIG. 1E shows a cross-sectional view, and FIG. 1F shows a top view of one embodiment of a flux unit 10. The following description will generally pertain to both FIGS. 1E and 1F. The flux unit 10 comprises a relatively horizontal perforated pipe 11, a relatively horizontal transport pipe 16, a relatively horizontal perforated pipe 12, a relatively vertical transport pipe 20, and a U-shaped tube 18. The relatively horizontal perforated pipe 11, relatively horizontal perforated pipe 12, and at least a portion of U-shaped tube 18 are substantially surrounded by leachate field 14. U-shaped tube 18 will contain water 21, or another liquid, or a combination of liquids. Flux unit 10 may be surrounded by waste 15. End 20 represents an end point of a non-perforated portion of U-tube 18. U-shaped tube 18 may be entirely positioned within leachate field 14, entirely positioned outside of leachate field 14, or partially positioned in leachate field and partially positioned outside of leachate field 14. The connection between perforated pipes 11, 12 and the respective horizontal and vertical transport pipes 16 may occur within the flux unit 10, at the boundary between the flux unit 10 and waste 15, or within waste 15.

The term "connection" may mean that the perforated pipe 11, 12 and the transport pipe 16 are different pipes that are connected to each other physically (e.g., threaded) and/or chemically (e.g., adhesives). Alternatively, the term "connection" may mean that one continuous pipe is used and one portion of the pipe 11, 12 is within the flux unit 10 and another portion of the same pipe 16 is outside the flux unit 10. One skilled in the art will appreciate that a continuous pipe may be used and that perforations may be placed in the pipe at locations that will occur within a flux unit 10.

The term "relatively" with respect to horizontal or vertical means that the pipe and/or matrix, described herein, is at a grade from 0° to 30° from horizontal or vertical; or at a grade from 0° to 15° from horizontal or vertical. The term "relatively horizontal" or "relatively vertical" does not require that the pipe and/or matrix be precisely horizontal or precisely vertical. Deviation from a precise horizontal and/or vertical orientation is expected based upon variations in the construction of the landfill and based upon different degrees of settling that will occur in different portions of the landfill over time.

The relatively vertical pipes 12, the relatively horizontal pipes 11 and the transport pipes 16 can be made of any material known in the art, e.g., HDPE, PVC, metal, and the like. The relatively vertical pipes 12, the relatively horizontal pipes 11, and the transport pipes 16 can be any size and/or cross-sectional area known in the art that will optimally perform the intended function of removing and/or adding gases and/or liquids from or to the landfill.

A leachate field 14 comprises one or more filler materials that (i) facilitate the distribution of gases and/or liquids from the perforated pipes into the landfill (e.g., efflux) and/or (ii) facilitate the removal of gases and/or liquids from the landfill into the perforated pipes (e.g., influx). The leachate field 14 has a permeability (i.e., to gases and/or liquids) that is greater than the permeability of the waste in the landfill. Any filler material known in the art that will perform this function is suitable for use in the invention. The leachate field may comprise one or more of the following materials: tire chips, glass cullet, stone (including crushed stone), gravel, sand, concrete waste, stone waste, construction waste (e.g., construction and demolition fluff), geotextiles, and the like. In one embodiment, the leachate field 14 comprises tire chips, glass cullet, geotextiles or a combination of two or more thereof. In another embodiment, the leachate field comprises tire chips, geotextiles or a combination of two or more thereof. The term "tire chips" includes the term "tire shreds," and generally refers to pieces of tire that have an average size of about 12 inches or less; about 8 inches or less; or about 4 inches or less. Geotextiles allow liquids and gases to pass into and out of the fabric/material, while substantially preventing soil or other debris from passing into the fabric/material and clogging the pipes. Geotextiles may comprise synthetic and/or natural materials.

The flux unit 10 may be any size that will satisfactorily perform the intended function as described herein. In one embodiment, the flux unit may have a size from about 20 cubic feet to about 1,500 cubic feet; from about 200 cubic feet to about 900 cubic feet; from about 550 cubic feet to about 700 cubic feet; or about 625 cubic feet. The flux unit may be any shape (e.g., regular or irregular). In one embodiment, the flux units have a two-dimensional horizontal area that is from about 2 feet by 2 feet to about 25 feet by 25 feet; from about 5 feet by 5 feet to about 15 feet to about 15 feet; or about 10 feet by 10 feet. In one embodiment, the flux units have a vertical depth that is 25 feet or less; 10 feet or less; 5 feet or less; 2 feet or less; less than 2 feet; 1.5 feet or less; or 1 foot or less. One skilled in the art will appreciate that the size and shape of the flux unit may vary and depend on a variety of factors, including the number and size of perforations in the pipe(s), the material used in the leachate field, the waste material in the landfill, and the location of the flux unit within the landfill. One skilled in the art will also appreciate that any particular landfill may comprise numerous flux units of varying sizes depending on the location of the flux units in the landfill. In one embodiment, the each flux unit in the landfill can receive of about 500 to about 2,000 gallons of liquid per acre per day; or about 5,00 to about 1,500 gallons of liquid per acre per day; or about 1,000 gallons of liquid per acre per day.

In the landfill, flux units are interconnected in a relatively horizontal and/or relatively vertical matrix via transport pipes 16. The transport pipes 16 may be perforated and/or solid. In one embodiment, the transport pipes 16 connecting the flux units are perforated. In another embodiment, the transport pipes 16 are perforated when they are placed in a relatively horizontal matrix and/or a relatively vertical matrix to connect flux units 10. When the transport pipes 16 are perforated they may optionally be surrounded by a leachate field 14. In one embodiment, the transport pipes 16 are surrounded by a leachate field 14 when they are in a relatively horizontal direction. The leachate field may be any known in the art, and, in one embodiment, the leachate field is stones or crushed stones.

In one embodiment, the transport pipes 16 are not surrounded by a leachate field 14 when they are in a relatively vertical direction. In another embodiment, the transport pipes 16 connecting the flux units are solid (i.e., they are not perforated and they do not permit the release or entry of gases and/or liquids). The use of solid transport pipes to connect the flux units 10 eliminates the need to surround the transport pipes 16 with a leachate field 14, and prevents the transport pipes 16 from becoming clogged by soil, waste, and/or bacteria. Thus, the transport pipes 16 connecting the flux units 10 allow for better flow of liquids and/or gases between the flux units in both the horizontal and vertical directions.

The systems and methods of the invention are used to create, manage and stage aerobic and/or anaerobic conditions within landfills. The systems and methods of the invention produce aerobic and/or anaerobic conditions within the landfills by (i) simultaneously introducing liquids and gases into landfills; (ii) alternately introducing liquids and gases into landfills; (iii) simultaneously removing liquids and gases from landfills; (iv) alternately removing liquids and gases from landfills; (v) simultaneously introducing liquids into landfills and removing gases from landfills; (vi) alternately introducing liquids into landfills and removing gases from landfills; (vii) simultaneously introducing gases into landfills and removing liquids from landfills; or (viii) alternately introducing gases into landfills and removing liquids from landfills. In other embodiments, the systems and methods of the invention may be used (i) to introduce gases into landfills and to remove gases from landfills; or (ii) to introduce liquids into landfills and to remove liquids from landfills. The systems and methods of the invention can achieve these goals using the flux units described herein.

Figure 2:
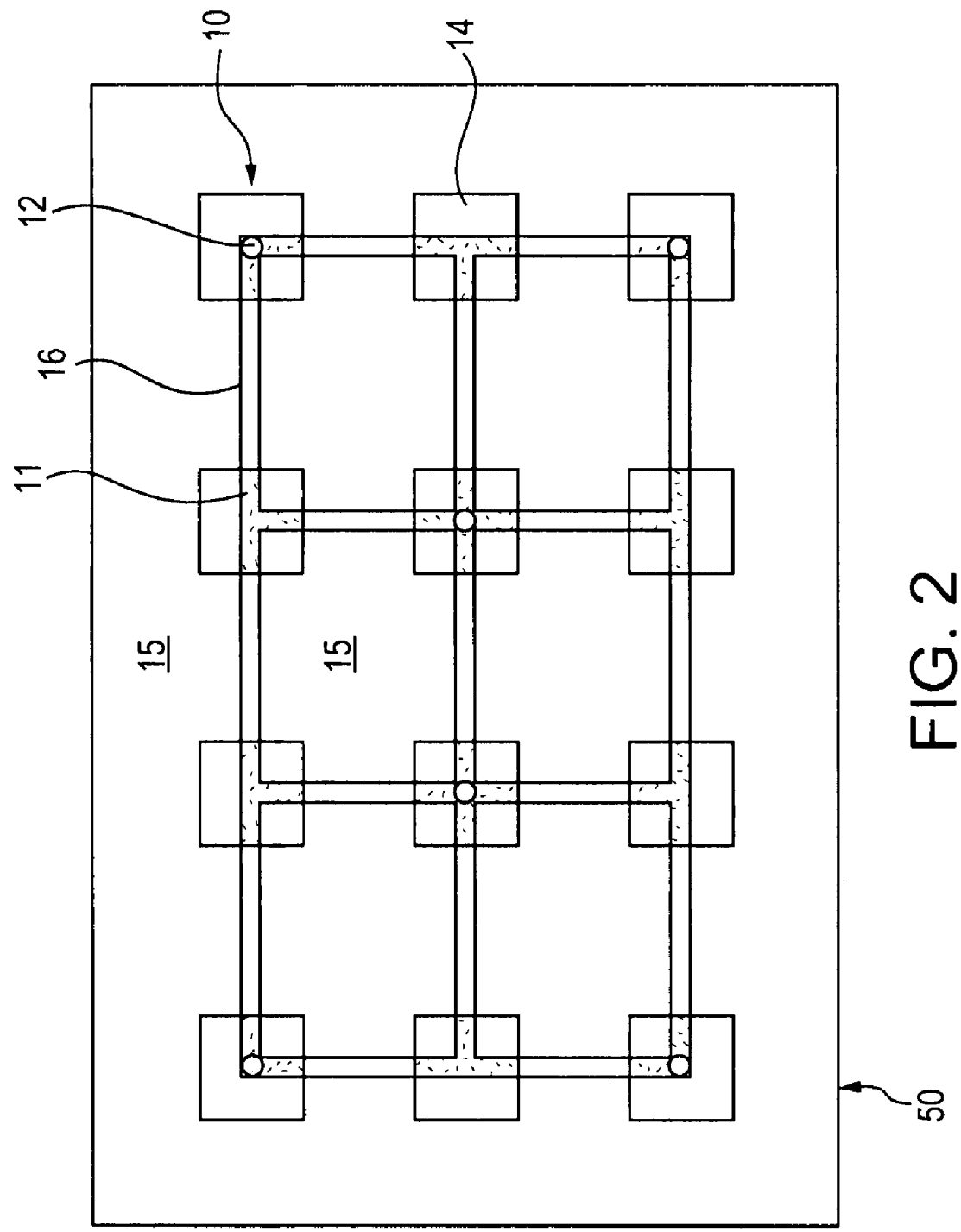
FIG. 2 shows an aerial, cross-sectional view of one embodiment of a landfill of the invention comprising a relatively horizontal matrix of flux units.

FIG. 2 is an aerial, cross-sectional view of one embodiment of a landfill comprising a relatively horizontal matrix of flux units 10. The flux units 10 comprise relatively horizontal perforated pipes 11, relatively vertical perforated pipes 12, and a leachate field 14. The flux units 10 are surrounded by waste 15, such as municipal solid waste. The flux units 10 are connected by a series of transport pipes 16. As can be seen from FIG. 2, the flux units 10 are linked together or interconnected by transport pipes 16 to form a relatively horizontal matrix. The distance between the flux units 10 can readily be determined by one skilled in the art. In one embodiment, the distance between flux units can be from about 20 feet to about 200 feet; from about 50 feet to about 150 feet; from about 75 feet to about 125 feet; or about 100 feet. The flux units are generally at least 50 feet from the edge of the land 50; at least 75 feet from the edge of the landfill 50; or at least 100 feet from the edge of the landfill 50. When the flux units are above-grade (i.e., above the level of the ground surrounding the landfill), the flux units are generally at least 125 feet from the edge of the landfill 50; or at least 150 feet from the edge of the landfill 50.

FIG. 2 is merely exemplary. The flux units 10 may or may not be evenly distributed throughout the landfill and/or throughout one or more cells within the landfill. One skilled in the art will appreciate that a relatively horizontal matrix of flux units can be created by locating flux units 10 at various positions relative to other flux units 10 within the landfill. For example, the relatively horizontal matrix need not be symmetrical, and the flux units can be located at any position (e.g., 45°, 90° and the like) relative to other flux units.

After the relatively horizontal matrix is complete (or during construction of the relatively horizontal matrix), waste 15 is placed over the flux units 10. The relatively vertical perforated pipes 12, which will be connected to transport pipes 16 outside the flux unit 10, will rise above the waste 15 to be vertically connected to another horizontal matrix of flux units or to extend beyond the waste to the outside of the landfill so that they can be used to inject and/or remove liquids and/or gases.

When the transport pipes 16 extend outside the waste in the landfill (e.g., either vertically or horizontally), they will be referred to herein as exit pipes 16a. In a horizontal matrix of flux units 10 such as that shown in FIG. 2, one or more flux units may comprise an exit pipe 16a. In one embodiment, alternating (i.e., every other) flux units will comprise an exit pipe 16a.

Exit pipes 16a may comprise a gas piping header and/or a liquid distribution manifold. A vacuum pump or other vacuum device may be associated with the gas piping header to draw landfill gas through the perforations in the pipes 11, 12 in the flux units 10. The gas (e.g., biogas, methane) withdrawn from the landfill can be vented and burned or it can be used for heating or other industrial purposes before or after removing unwanted liquids and other contaminants from the gas. The liquid distribution manifold may comprise a valve for controlling the amount of liquid that is injected into the landfill or to turn the liquid injection valve on or off. The control of liquid injection/withdrawal and the control of gas injection/withdrawal may be automatic or manual. Other devices may be associated with the gas piping header and/or liquid distribution manifold to control gas/liquid temperatures, compositions, pressures, and the like.

Figure 3:
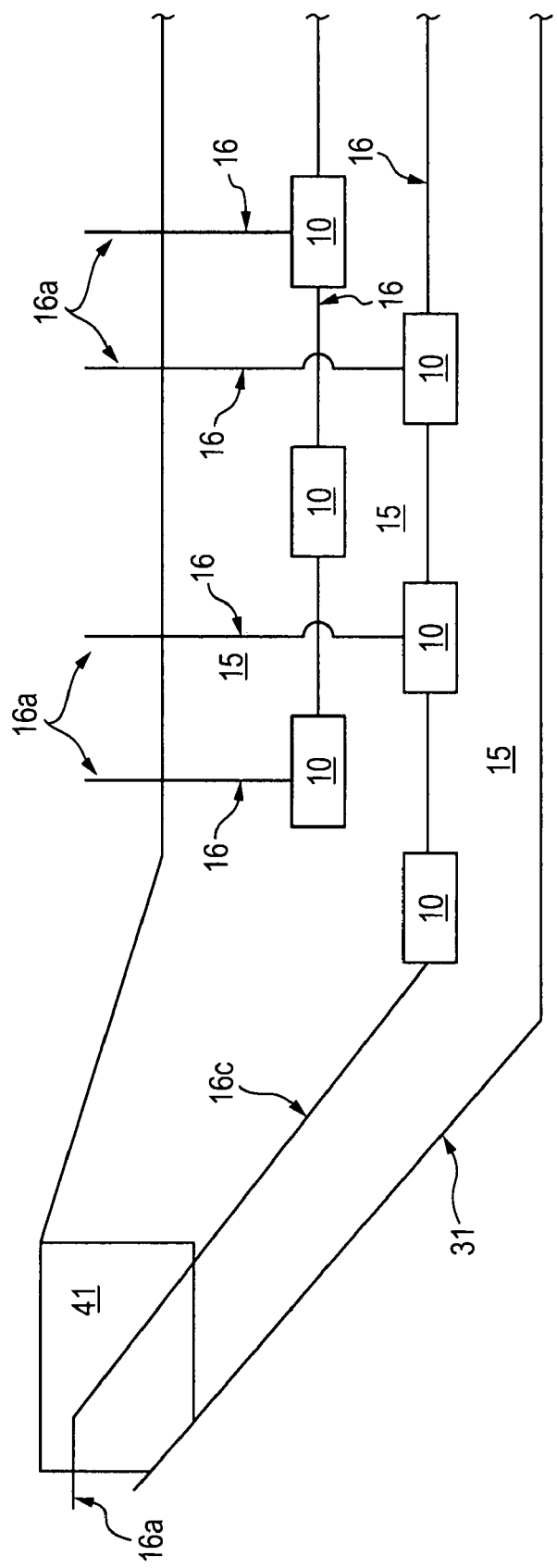
FIG. 3 is cross-sectional view of one embodiment of a landfill of the invention comprising two relatively horizontal matrixes of flux units. One skilled in the art will appreciate that the relationship between the relatively vertical pipes and the relatively horizontal pipes can be (i) as shown in FIG. 1A; (ii) as shown in FIG. 1D; or (iii) any combination shown in FIGS. 1A and 1D.
Figure 5:
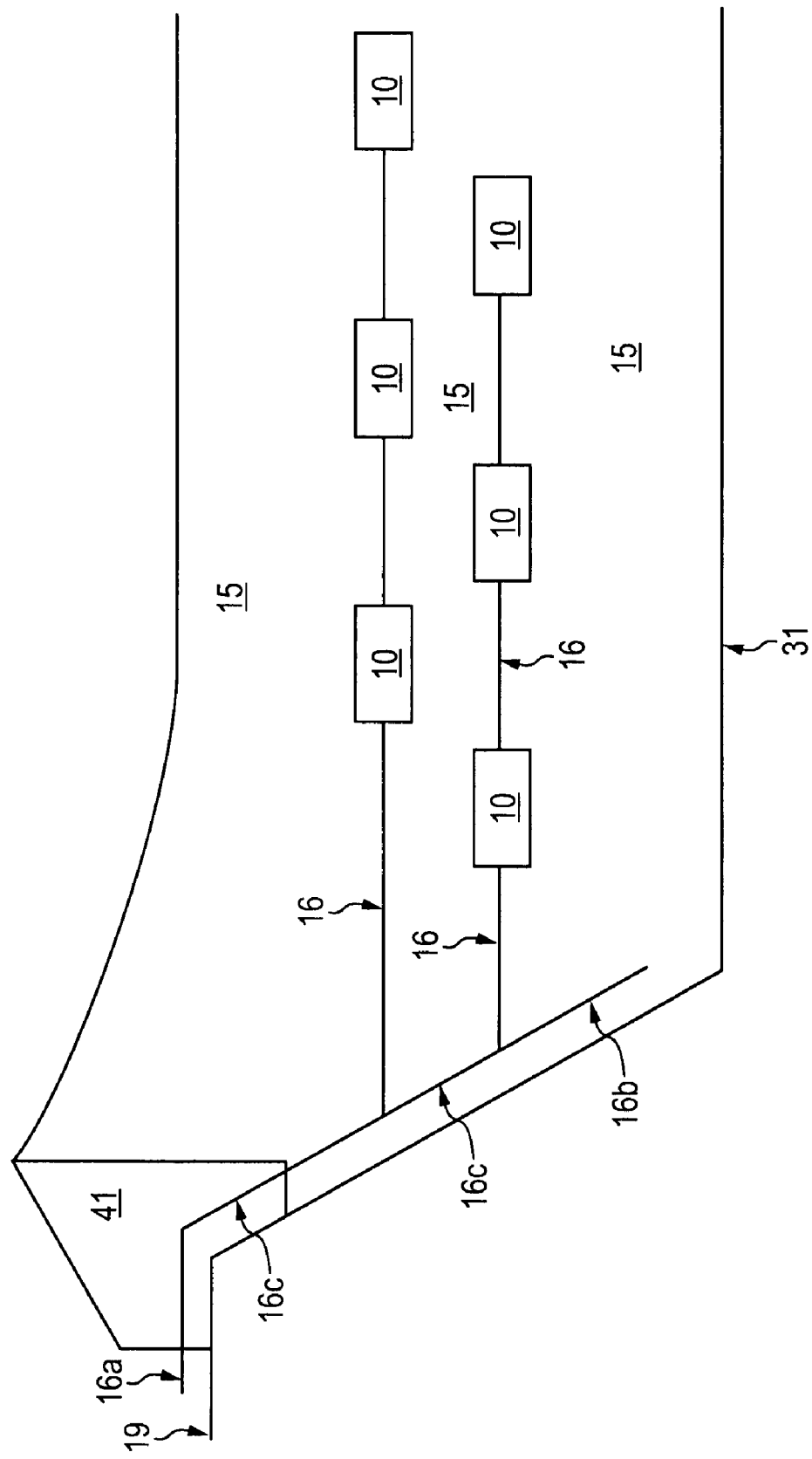
FIG. 5 is a cross-sectional view of one embodiment of a landfill of the invention comprising two relatively horizontal matrixes of flux units.

FIGS. 3 and 5 are cross-sectional views of different embodiments of landfills comprising two relatively horizontal matrixes of flux units. The landfill may comprise a leachate collection system 31 to prevent the waste 15 and leachate from coming into contact with the soil and water around/beneath the landfill. Leachate collection systems 31 are known in the art. Although not shown in the drawings, the leachate collection system 31 may comprise a means (e.g., one or more pipes having open ends or perforations) to allow leachate to collect inside the pipe(s) and be withdrawn from the bottom of the landfill.

The flux units 10 are connected by a series of transport pipes 16, which may optionally be surrounded by a leachate field. As can be seen from FIG. 3, the flux units 10 are linked together or interconnected to form two horizontal matrixes that are not vertically connected by transport pipes. In this embodiment of the invention, vertical and horizontal exit pipes 16a are in communication with the outside of the landfill and may be used to remove liquids and/or gases from the landfill or to add liquids and/or gases to the landfill. In other embodiments, only vertical pipes may be used or only horizontal pipes may be used as exit pipes 16a. In other alternative embodiments, relatively horizontal matrixes of flux units 10 that are adjacent to each other, as shown in FIG. 3, may be vertically connected by transport pipes 16.

As can be seen from FIG. 5, the flux units 10 are connected to form two horizontal matrixes that are connected by a pipe 16c that leads to the exit pipe 16a. The pipe 16c further comprises a solid portion 16b that extends beyond the lowest level of the relatively horizontal matrix of flux units 10, and that portion 16b remains filled with liquids. The solid portion 16b that extends beyond the lowest level of the relatively horizontal matrix of flux units 10 may optionally comprise a U-trap. The portion 16b of the pipe extends for a distance of about 5 feet to about 20 feet beyond the lowest transport pipe 16 that is in communication with the lowest level of flux units 10; or from about 5 feet to about 15 feet; or from about 5 feet to about 10 feet. This feature 16b allows for the influx and efflux of gases and liquids in the horizontal matrixes of flux units 10. The relatively horizontal transport pipes 16 may optionally be surrounded by a leachate field. In another embodiment, only the relatively horizontal transport pipes 16 that are located between flux units 10 may optionally be surrounded by a leachate field.

With reference to FIGS. 3 and 5, once the level of waste in the landfill rises about the natural ground level 19, a low permeable soil plug 41 may be used to prevent leachate, run-off and waste from coming out of the landfill. The soil plug is generally 10 times less permeable than the permeability of the waste.

The vertical distance between the relatively horizontal matrixes of flux units can readily be determined and optimized by one skilled in the art. In one embodiment, the vertical distance between relatively horizontal matrixes of flux units (i.e., the amount of waste material that is placed between the relatively horizontal matrixes) can range from about 5 feet to about 50 feet; from about 10 feet to about 40 feet; from about 15 feet to about 25 feet; or about 20 feet. When the waste in the landfill is at grade or above grade, the distance between the relatively horizontal matrixes of flux units (i.e., the amount of waste material that is placed between the relatively horizontal matrixes) can range from about 15 feet to about 50 feet; about 20 feet to about 40 feet; from about 25 feet to about 35 feet; or about 30 feet.

Landfills can be created with a plurality of horizontal matrixes of flux units. In one embodiment, alternating horizontal matrixes of flux units may be connected by vertical pipes. In other embodiments, every horizontal matrix of flux units may be connected with the horizontal matrix of flux units immediately above and/or below it with vertical pipes.

In some embodiments of the invention, every flux unit can comprise a vertical pipe for communication with another flux unit in a different horizontal matrix or for communication with the outside of the landfill. In other embodiments, only select flux units need to be in communication with a flux unit in another horizontal matrix or for communication with the outside of the landfill. In still other embodiments, alternating flux units are in vertical communication with a flux unit in a different horizontal matrix and for communication with the outside of the landfill. The number of exit pipes used in the landfill design will be depend on a variety of factors, including the relative moisture/water content of the landfill and/or the relative amount of gases produced by the landfill. "Communication with the outside of the landfill" also refers to exit pipes 16a or for the ability to use the pipe to withdraw and/or add liquids and/or gases from/to the landfill.

Figure 4:
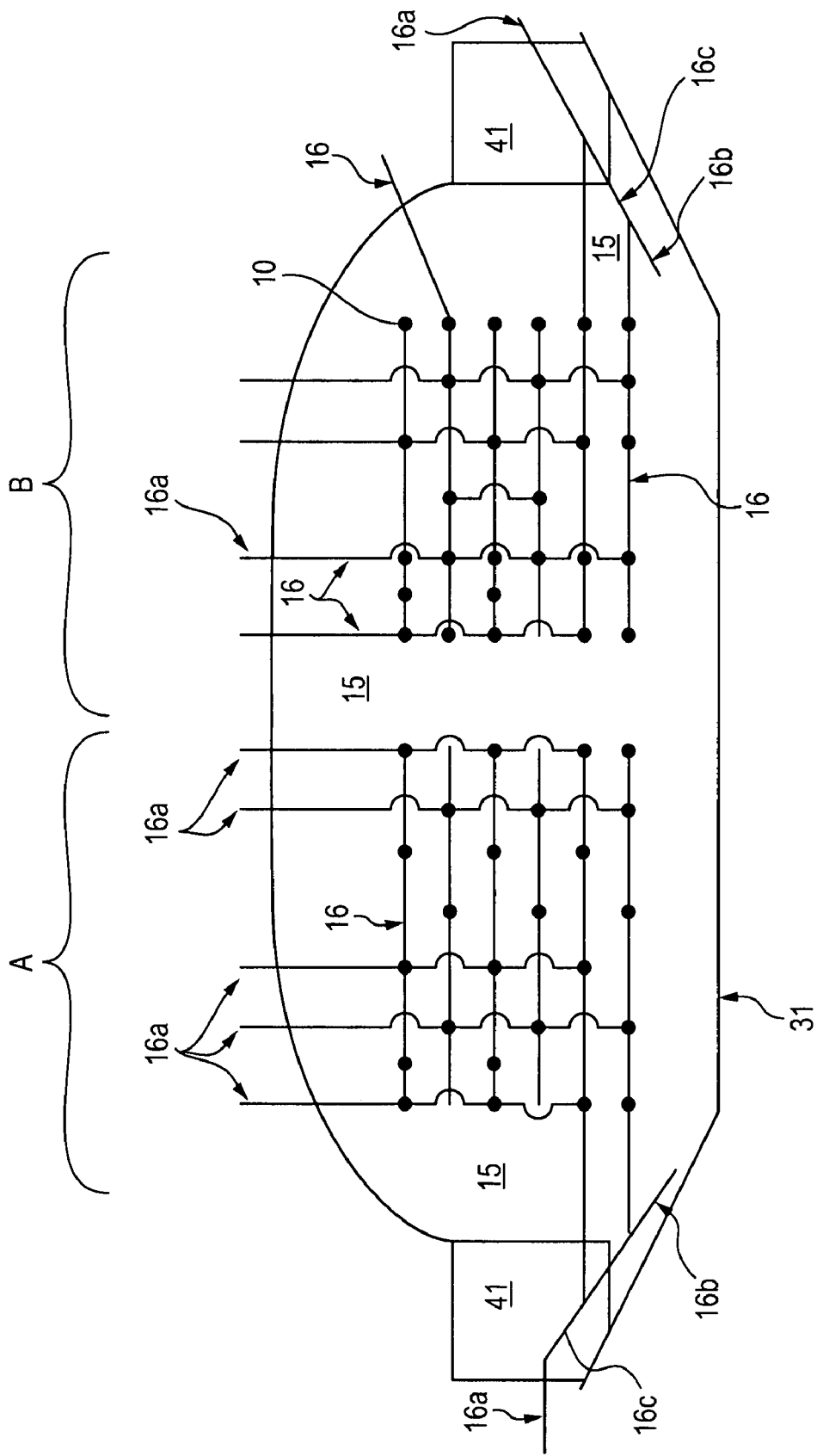
FIG. 4 is a cross-sectional view of one embodiment of a landfill of the invention comprising two cells, each of which comprise two matrixes of flux units. One skilled in the art will appreciate that the relationship between the relatively vertical pipes and the relatively horizontal pipes can be (i) as shown in FIG. 1A; (ii) as shown in FIG. 1D; or (iii) any combination shown in FIGS. 1A and 1D.

FIG. 4 is cross-sectional view of a landfill comprising a plurality of horizontal matrixes of flux units 10 in two cells A, B located in the landfill. The flux units 10 are identified by solid circles (●). One skilled in the art will appreciate that the landfill may comprise a plurality of cells, and the cells may be next to each other in a vertical and/or horizontal relationship. The landfill comprises a leachate collection system 31 to prevent the waste 15 and leachate from coming into contact with the soil and water around/beneath the landfill. The flux units 10 are connected by a series of solid horizontal and/or vertical transport pipes 16, identified as solid lines (—). As can be seen from FIG. 4, the flux units 10 are linked together or interconnected to form a plurality of relatively horizontal matrixes. In this embodiment, alternating relatively horizontal matrixes may optionally be connected by relatively vertical pipes. In this embodiment of the invention, exit pipes 16a are in communication with the outside of the landfill and may be used to remove liquids and/or gases from the landfill or to add liquids and/or gases to the landfill. Every flux unit 10 does not need to be connected to a vertical pipe 16 within the system or to an exit pipe 16a. In one embodiment, alternating flux units are connected to a flux unit in alternating horizontal matrix and are in communication with the outside of the landfill as exit pipes.

In addition, flux units 10 in accordance with the embodiment described in FIGS. 1E and 1F can also be used, for example, in connection with FIG. 4. For example, exit pipe 16a can be connected to a first uppermost flux unit 10 (i.e., a flux unit 10 closest to a top surface of the landfill). Flux units 10 in FIGS. 1E and 1F can also be operably communicative with the first uppermost flux unit 10, as shown, for example, in FIG. 4. In addition, exit pipe 16a can be connected to a second uppermost flux unit 10, which may be adjacent or non-adjacent to the first uppermost flux unit 10. Additional flux units 10 in accordance with the embodiment shown in FIGS. 1E and 1F can also be operably communicative with the first and second uppermost flux units 10, as is shown in FIG. 4.

When an exit pipe 16a is used to extract gases, at least a portion of exit pipe 16a is perforated. When an exit pipe 16a is used to extract or inject liquids into the landfill, exit pipe 16a can be solid or perforated. When an exit pipe 20 (another embodiment is shown in FIG. 4, 16a) is used to extract or inject liquids under pressure, exit pipe 20 will be solid (non-perforated), as is shown in the embodiment of FIGS. 1E and 1F. When exit pipe 20 is used to extract or inject liquids under pressure, the pressure allows for faster injection and/or extraction of liquids. A determination of whether to use perforated exit pipe 16a or solid exit pipe 20 (as shown in FIG. 1E) can be based, for example, on the composition and/or wetness/dryness of the waste 15, and/or the need to introduce or remove liquids and/or gasses to accomplish the desired affect within waste 15 or, more broadly, the landfill. Exit pipes 20 may be strategically installed and positioned as may be determined, for example, by the waste 15 composition of the landfill generally, and/or the composition of a localized area of waste 15 within the landfill. Flux units 10 are typically installed, for example, months or years prior to performing a vertical drill to install an exit pipe 16a.

Additions or extensions to vertical pipe 20 can be made or provided as landfilling progresses (i.e., when the height of the landfill increases). A lower portion of exit pipe 20 can extend below the lowermost horizontal pipe 16 within the landfill by, for example, 3 ft to 15 ft, depending on the estimated vacuum to be applied to pipe 20, as may be determined by the size of the horizontal pipe 16, the proximity to a gas extraction system used to remove gases from the landfill, and/or the relative vacuum applied by the gas extraction system.

By strategically placing solid or perforated pipe 16a, or exit pipe 20 (as shown in FIGS. 1E and 1F), as described above, liquids can be introduced vertically into a flux unit 10, and into a surrounding leachate field 14. The liquids serve to "strip out" selective material, contaminant or particulate from the gases being extracted by nearby (e.g., adjacent) perforated pipes (16a or 16) as the liquid moves vertically downward to one or more flux unit 10 and/or horizontal pipes 16 an/or vertical pipes 16. Various liquids can be introduced that could aid in gas production, densify waste or strip, scrub, and/or remove contaminants, nutrients, particulates, etc.

In addition, because an embodiment in accordance with FIGS. 1E and 1F can be constructed in advance of a need, any exit pipe(s) 16a used to inject or extract liquid or gas will not adversely impact the performance of flux units 10. The embodiment shown in FIGS. 1E and 1F can be used when landfilling has reached 20 feet or more in depth. FIGS. 1E and 1F can be utilized when placed approximately 100 feet or more measured horizontally from an edge of the landfill. In another embodiment, leachate fields 14 can be vertically continuous provided that relatively horizontal pipe 16 and horizontal pipe 12 are vertically separated by approximately at least 10 feet. Gases and/or liquids may be selectively added and/or removed from the landfill using one, two or more vertical/horizontal exit pipes 16a to add/remove the gases or liquids. For example, if a monitoring well(s) in cell A indicates that the landfill is appropriately hydrated, and a monitoring well(s) in cell B indicates that the landfill is too dry, liquids may be selectively added to the exit pipes 16a that are connected to cell B. Even more particularly, liquids may be selectively to added to some, and not other, exit pipes 16a that are connected to cell B. One skilled in the art will appreciate that liquids and gases are added/removed to the landfill in a controlled manner (e.g., manually controlled and/or automatically controlled) to optimize the aerobic or anaerobic conditions. The gas and liquid distribution systems are designed to be flexible to accommodate the types and variability of the landfill waste. As a result, the embodiment of the invention will differ from landfill to landfill as to the spacing of the flux units, monitoring wells, and the like.

Figure 6:
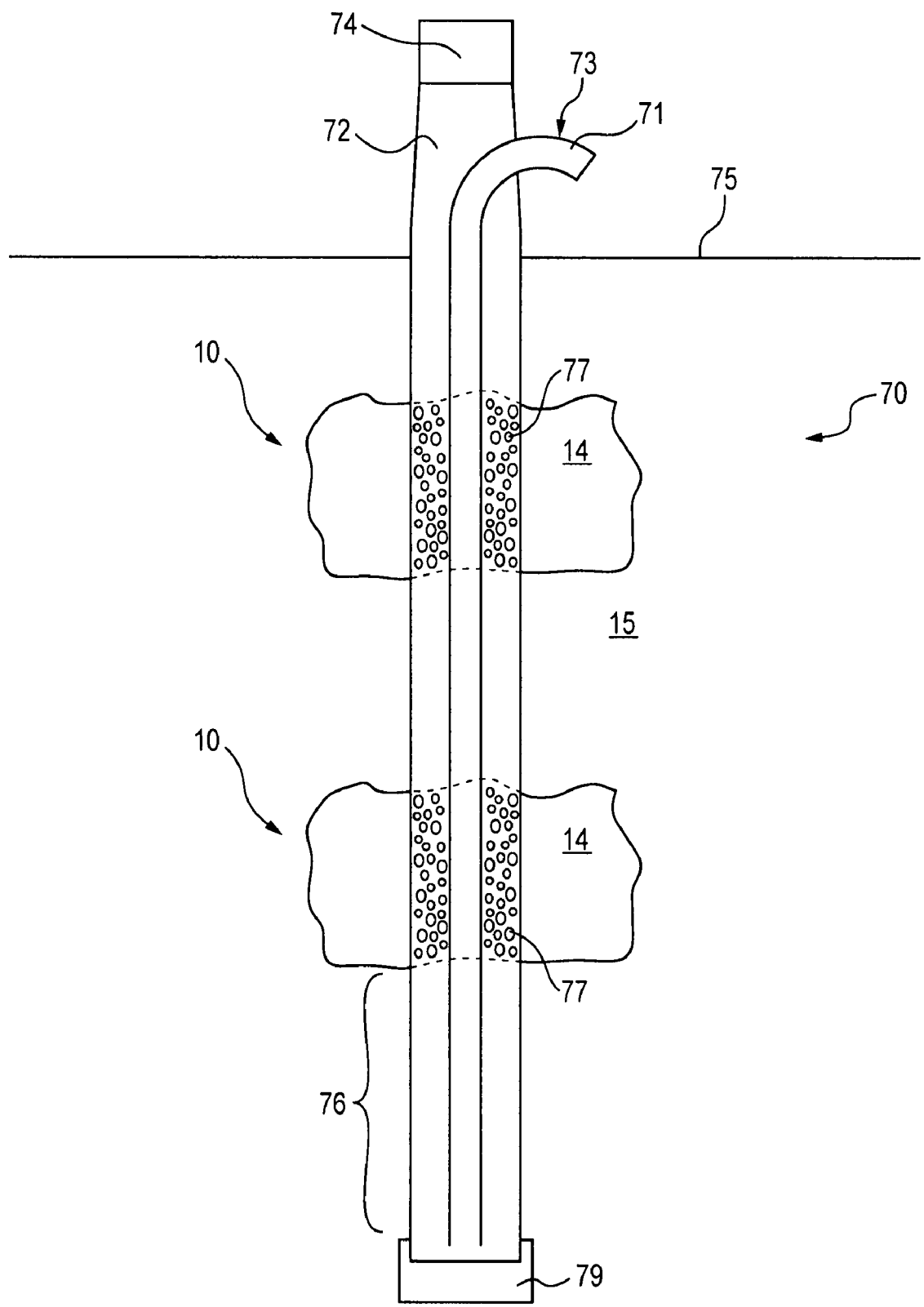
FIG. 6 is a cross-sectional view of a novel pipe of the invention

FIG. 6 shows a novel relatively vertical pipe 70 of the invention. The relatively vertical pipe 70 of the invention can be used as the relatively vertical pipe 12, a relatively vertical transport pipe 16 a relatively vertical exit pipe 16a and/or a relatively horizontal pipe 16a that exits from the side of the landfill as described with reference to the other figures. The novel pipe 70, which comprises a first tube 71 coaxially disposed within a second tube 72, allows for the landfill operator to (i) simultaneously withdraw liquid and gas from the landfill; (ii) simultaneously add liquid and gas to the landfill; (iii) simultaneously add liquid and withdraw gas from the landfill; and (iv) simultaneously withdrawn liquid and add gas to the landfill.

The inner tube 71 comprises a means 73 for adding liquids to the inner tube 71 and/or removing liquids from the inner tube 71. The outer tube 72 comprises a means 74 for adding gases to the outer tube 72 and/or removing gases from the outer tube 72. The means 73, 74 for adding and/or removing gases and/or liquids are generally located above ground level 75. The means 73, 74 may comprise any mechanical device necessary to perform their intended functions, such as vacuum devices and/or pressurizing devices.

The pipe 70 may be any length that will allow it to perform its intended function. At a desired depth or location, the outer tube 72 has perforations 77 which allow for the exchange of gases and/or liquids between the outer tube 72 and the area around the pipe 70. In an alternative embodiment, both the outer tube 72 and the inner tube 71 have perforations as described herein. The pipe 70 may have one or more areas defined by perforations 77 along its length. The area around the pipe 70 may be landfill or earth. With reference to the previous figures, the area around the pipe 70 where the perforations 77 are located is preferably a leachate field 14. Accordingly, a flux unit 10 comprises a leachate field 14 and a pipe 70 that comprises perforations 77 on the outer tube 72. In one embodiment, the pipe 70 is solid 76 at a location beneath the perforations. The pipe 70 may optionally comprise an end cap 79. Generally, the solid 76 area of the pipe 70 at the bottom will remain filled with liquids.

The inner tube 71 and the outer tube 72 may be made of any materials known in the art, such as HDPE, PVC, metal and the like. The inner tube 71 and the outer tube 72 may have any dimensions known in the art that will allow the pipe 70 to perform its intended function. In one embodiment, the inner tube 71 has a diameter from about 0.25 inches to about 10 inches; from about 0.5 inches to about 5 inches; from about 0.75 inches to about 3 inches; or about 1 inch. In one embodiment, the outer tube 72 has a diameter from about 1 inch to about 20 inches; from about 2 inches to about 15 inches; from about 3 inches to about 10 inches; or about 6 inches.

Figure 7:
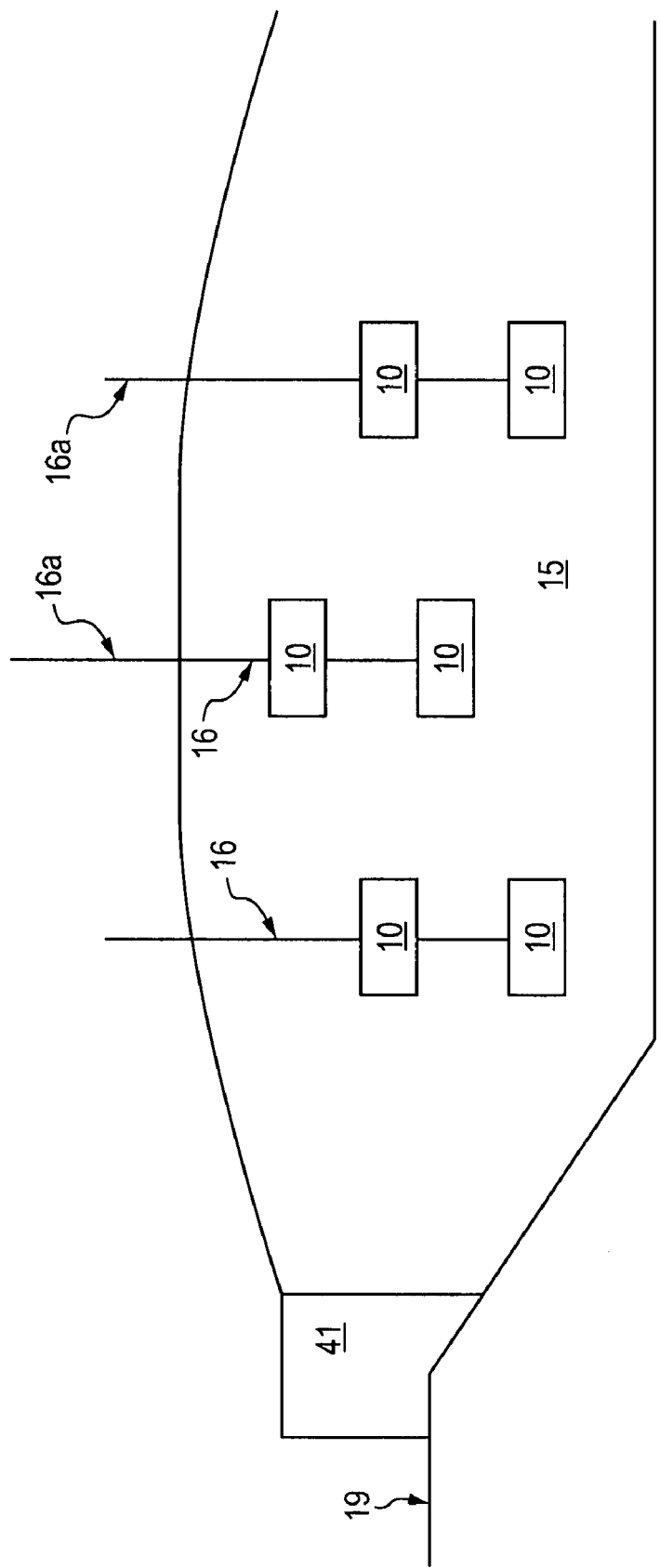
FIG. 7 is a cross-sectional view of one embodiment of a landfill of the invention which comprises vertical matrixes of flux units. The relatively vertical pipes in FIG. 7 may be the novel pipes shown in FIG. 6.

One skilled in the art will appreciate that the landfills of the invention may comprise relatively horizontal pipes and relatively vertical pipes that are in communication with each other within the leachate field 14 in the flux units 10, as shown in FIGS. 1A and 2-4. In other embodiments, the landfills of the invention may comprise relatively horizontal pipes, such as those shown in FIG. 5 and relatively vertical pipes, such as that shown in FIG. 7 that are not in communication with each other, but where the relatively horizontal pipes and relatively vertical pipes are both located in the leachate field 14 within the flux unit 10. For example, several layers of relatively horizontal matrixes are installed, such as shown in FIG. 5, relatively vertical wells, such as those shown in FIG. 7, are drilled into the landfill. In one embodiment, the relatively vertical wells will be drilled through the relatively horizontal pipes to form connections such as that shown in FIG. 1A. In other embodiments, the relatively vertical wells will be drilled close to and within the same leachate field, but not through the horizontal pipes. In either case, the goals of the invention can still be achieved.

FIG. 7 shows another embodiment of the landfill of the invention which comprises flux units 10 that are in a vertical matrix and connected by relatively vertical pipes 16 that extend beyond the surface of the landfill as exit pipes 16a. In this embodiment of the invention, the flux units 10 are connected in vertical matrix to allow for the influx and/or efflux of gases and/or liquids. The relatively vertical pipes 16 may be drilled into the landfill at any time; however, they are preferably drilled into the landfill after one, two or three horizontal matrixes of flux units have been installed. Generally, the vertical pipes 16 are installed by GPS or other systems that allows for the precise drilling of the vertical pipes 16 so that they pass through the leachate field in the flux units 10, and also optionally pass through the horizontal pipe that may also be present in the flux unit.

The landfills of the invention may further include one or more monitoring wells. The monitoring wells may be the vertical pipes shown and described in FIGS. 6 and 7. The monitoring wells may have an open bottom or perforations near the point where monitoring is to be conducted. The monitoring wells may be thermocoupling monitoring wells, piezeometer wells or other types of monitoring devices that are known in the art for monitoring and controlling landfill gas and/or liquid collection. The monitoring wells may be used to monitor waste moisture content, temperature and off-gas concentrations (volatile organic compounds, carbon dioxide, oxygen, and methane). Measurements may be taken, for example, using vapor points and temperature probes that are within the monitoring well or that are installed directly into the waste. Leachate analyses may be undertaken using the monitoring wells. The analysis may be taken for conditions such as acidity, total kjeldahl nitrogen (TKN), biochemical oxygen demand (BOD), chemical oxygen demand (COD), metals, volatile organic compounds (VOC), and the like. The monitoring wells may be checked manually or automatically. In one embodiment, the monitoring wells may be checked by GPS. Automatic review and consideration of the data generated by the monitoring wells may allow for the automatic addition and/or withdrawal of liquids and/or gases into or out of the landfill.

The addition of materials to accelerate the aerobic and/or anaerobic decomposition of compostable waste material in the landfill is within the scope of this invention. Additive materials may be incorporated into the waste as it is being added to the landfill or it may be added to the waste through the gas or liquids added to the waste through the flux units. For example, sludge, animal manure, fermentor by-products and the like may be added to the waste material or to liquids added to the waste material by the liquid dispersion units in order to provide microorganisms that accelerate or enhance aerobic and/or anaerobic biodegradation of waste. In addition, nutrients such as phosphorous, phosphoric acid, biosolids, buffered phosphate and the like may be added directly to the waste or may be added to liquids applied to the waste to accelerate anaerobic or aerobic degradation. Nitrated ($NO_3$) leachate may be added as a means to accelerate nitrate degradation and to eliminate ammonia build up.

To achieve the goals described herein a landfill, or cell(s) within a landfill, is designed and the method is intended to promote anaerobic decomposition of the waste with liquid recirculation (e.g., removal of leachate from the landfill and addition of liquid to the landfill) and optionally, addition of methanogenic organisms, addition of nutrients and/or pH adjustment. In this anaerobic mode, production of methane is monitored and when methane production begins to subside, the treatment switches to aerobic decomposition of the remaining waste. By the time aerobic digestion begins, the anaerobic bacteria should have consumed the majority of organic materials in the waste, which reduces the potential for landfill fires in the subsequent aerobic phase.

Operation of the landfill or landfill cell(s) may begin by initiating collection of biogas produced within the landfill. The gas extraction rate is initially based upon modeled gas production determined during waste preparation. Actual composition of the extracted gas is measured and the rate of gas exhaustion is matched to actual methane production. Leachate generated during biodegradation is collected using the flux units and liquids (e.g., leachate) is distributed to the waste using the flux units based on the estimated field capacity of the quantity of waste under treatment. If sufficient liquids are present in the waste, no additional liquid is required. The content of nutrients and the pH of the leachate may be monitored and the pH may be buffered and nutrients may be added as necessary to maintain the properties within select parameters.

Maintaining adequate moisture content is believed to be an important operational property determining the effective performance of a landfill. Liquid within the landfill transports nutrients, enzymes and microorganisms; dilutes inhibitory compounds; exposes waste surfaces to microbial attack; serves as a reactant in the hydrolysis reactions; and transports pH buffers. Excess liquid will also displace oxygen in the void spaces within the waste, which promotes development of anaerobic conditions.

Moisture content within a landfill is generally discussed using the concept of field capacity, a term borrowed from soil scientists. Field capacity is generally defined as the maximum amount of liquid a sample of waste will retain against gravity through capillary forces. It can be measured in a laboratory by subjecting a saturated waste sample to a suction head of 100 cm water, and then determining the resultant moisture content of the waste. In practice, field capacity is generally understood to be the amount of liquid that a saturated sample of waste will retain after it has freely drained. Adding liquid to waste in excess of the field capacity (which will inevitably occur in localized areas due to short circuiting) will result in continuous drainage from the waste.

Estimating the field capacity of the waste in the landfill is important because it allows the landfill operator to determine the quantity of liquid that needs to be added. The moisture content of the waste should be maintained at or near field capacity; this will result in continuous leachate drainage from the cell and increase the liquid-filled pores within the waste. Field capacity is a function of waste composition, age and density. Typical field capacity values range from about 20 to about 50% on a wet weight basis.

In operating (and planning) the landfill, all inputs and outputs of liquid will need to be monitored and controlled to achieve the optimum moisture content in the waste. The inputs include: storm water infiltration (including snowmelt), leachate recirculation, liquid addition, initial moisture in the different waste streams. The outputs include: leachate collection, water vapor in gas collection system, evapo-transpiration from the landfill cover.

Storm water is controlled by proper landfill surface contouring and final cover, as well as proven run-on and run-off controls that have been developed for normal landfill operation. Leachate recirculation and liquid (e.g., water) addition rates are computed based on the water balance for the landfill, computed at least monthly by subtracting the above outputs from inputs.

In addition to liquid management, optimizing production of methane is integral to the efficient operation of the landfill. Gas flow rate and composition are preferably measured daily, particularly in cases where the methane is intended as an energy source. Methane extraction flow rates from different parts of the landfill will need to be adjusted to extract the amount of methane actually being produced; over extraction is signaled by high $CO_2$ to methane ratios indicating localized aerobic digestion being caused by air intrusion.

As the production of methane subsides, the invention contemplates switching from anaerobic to aerobic digestion. At this phase, air is pumped into the landfill through the flux units which stops anaerobic digestion and promotes aerobic digestion. The stimulated aerobic digestion will consume the remaining decomposable organic material and render it inert or composted organic matter. It is contemplated that this process may be completed within about 45-85 days. The risk of landfill fire normally associated with aerobic digestion will be minimized since the majority of the easily decomposable materials will have already been anaerobically decomposed. The risk may be further limited by minimizing the depth of the aerated layer and controlling porosity uniformity since ignition points are normally dense, moist and non-porous so heat accumulates without migration.

In order to accommodate both the aerobic and anaerobic digestion, the piping and flux units are designed to handle both the maximum biogas production during the anaerobic phase and the required delivery of air during the aerobic phase. The biogas production rate estimate must take into account the acceleration of gas production expected due to efficient bioreactor operation. Studies have indicated that bioreactor operation has increased biogas production 2.1 to 4.5 times over conventional landfill operation.

The initial rate of supplying air to the landfill during the aerobic phase is initially based on an estimated rate required for composting the organic materials present. The air entering/exiting the system is monitored to measure temperature, $CO_2$ content and methane production. The air flow rate should be maintained to achieve a target temperature for the aerobic digestion and to minimize methane production (which is indicative of anaerobic digestion). Preferably, the temperature is maintained below 200° F.

During aerobic digestion, leachate recirculation and liquid addition, as needed, continues based on the composting water demand. In addition, the properties of the leachate may be monitored to ensure pH, total nitrogen, nitrate, TKN, ammonia, total phosphorous, micro-nutrients and microorganisms remain within select parameters. As in the anaerobic phase, the recirculated leachate can be used as a vehicle for adding buffers or nutrients as necessary to maintain the properties within the select parameters. When exhaust odors diminish and temperature monitoring shows a declining pattern, aeration can end. As understood by one skilled in the art, diminishing odor is indicative of volatile fatty/organic acid concentration diminishing, which typifies an end of aerobic digestion.

Although the invention has been set forth in detail, one skilled in the art will appreciate that numerous changes and modifications can be made to the invention, and that such changes and modifications can be made without departing from the spirit and scope of the invention.

What is claimed is:

1. A landfill comprising:
   (i) waste;
   (ii) a plurality of interconnected flux units distributed in a relatively horizontal matrix and/or a relatively vertical matrix, wherein each flux unit comprises at least two pipes, each of which comprise perforations and are surrounded by a filler material;
   wherein at least one flux unit comprises a substantially U-shaped portion, wherein at least a first end of the substantially U-shaped portion extends vertically below the at least two pipes of the at least one flux unit and is operably communicative with at least one of the at least two pipes of the at least one flux unit; and
   (iii) a plurality of non-perforated pipes connected to the perforated pipes; wherein the plurality of non-perforated pipes connect at least a first flux unit and a second flux unit in the relatively horizontal and/or relatively vertical matrix, and a relatively vertical pipe is operably communicative with a second end of the U-shaped portion.

2. The landfill according to claim 1, wherein the relatively vertical pipe is capable of removing liquids from the landfill.

3. The landfill according to claim 1, wherein the relatively vertical pipe is capable of injecting liquids into the landfill.

4. The landfill according to claim 1, wherein each flux unit is located at least 10 feet away from an adjacent flux unit in the relatively horizontal and/or relatively vertical direction.

5. A waste management system for a landfill comprising:
   a plurality of flux units, wherein the plurality of flux units are interconnect in a relatively first horizontal matrix and/or a relatively first vertical matrix, wherein at least one of the plurality of flux units facilitates the influx and/or efflux of liquids and/or gases from the landfill, wherein each flux unit comprises:
   a relatively horizontal perforated pipe located within a flux unit, wherein the relatively horizontal perforated pipe is capable of allowing the influx and/or efflux of liquids and/or gases;
   a relatively horizontal transport pipe, wherein the horizontal transport pipe is connected to the relatively horizontal perforated pipe;
   a relatively vertical perforated pipe located within the flux unit, wherein the relatively vertical perforated pipe is capable of allowing the influx and/or efflux of liquids and/or gases;
   a relatively vertical transport pipe, wherein the vertical transport pipe is connected to the relatively vertical perforated pipe; and
   a substantially U-shaped tube, wherein a first end of the U-shaped tube is connected to the relatively horizontal pipe, wherein a second end of the U-shaped tube is connected to the relatively vertical pipe, wherein the relatively horizontal perforated pipe and the relatively vertical pipe is substantially surrounded by a leachate field.

6. The system of claim 5, wherein the connection between the relatively horizontal perforated pipe and the relatively horizontal transport pipe is located on at least one of: within the flux unit, at the flux unit boundary, or outside the flux unit boundary.

7. The system of claim 5, wherein the connection between the relatively vertical perforated pipe and the relatively vertical transport pipe is located on at least one of: within the flux unit, at the flux unit boundary, or outside the flux unit boundary.

8. The system of claim 5, wherein the substantially U-shaped tube comprises at least one liquid.

9. The system of claim 5, wherein the leachate field facilitates the distribution of gases and/or liquids from the perforated pipes into the landfill.

10. The system of claim 5, wherein the leachate field facilitates the removal of gases and/or liquids from the landfill into the perforated pipes.

11. The system of claim 5, wherein the leachate field comprises at least one filler material.

12. The system of claim 11, wherein the filler material comprises tire chips, glass cullet, stone, gravel, sand, concrete waste, stone waste, construction waste, a geotextile, or a combination of two or more thereof.

13. The system of claim 5, wherein the substantially U-shaped tube is located within the leachate field.

14. The system of claim 5, further comprising at least one exit pipe connected to at least one flux unit, wherein the exit pipe is in communication with the outside of the landfill, and wherein the at least one flux unit is an uppermost flux unit.

15. The system of claim 5, further comprising a plurality of exit pipes, wherein a first end of the plurality of exit pipes are connected to the plurality of flux units in the relatively first horizontal matrix and/or the relatively first vertical matrix, and wherein a second end of the plurality of the exit pipes are connected to a plurality of flux units interconnect in a relatively second horizontal matrix and/or a relatively second vertical matrix.

16. The system of claim 5, further comprising at least one monitoring well for monitoring landfill moisture content, temperature and off-gas concentrations.

17. The system of claim 16, wherein the at least one monitoring well is at least one of a thermocoupling monitoring well or a piezeometer wells.

* * * * *

UNITED STATES PATENT AND TRADEMARK OFFICE
CERTIFICATE OF CORRECTION

PATENT NO. : 7,422,393 B2
APPLICATION NO. : 11/698021
DATED : September 9, 2008
INVENTOR(S) : John Schwalbe It is certified that error appears in the above-identified patent and that said Letters Patent is hereby corrected as shown below:

Title page, item [73] Assignee: "Ruthland" has been replaced with Rutland.

Signed and Sealed this

Second Day of December, 2008

JON W. DUDAS
*Director of the United States Patent and Trademark Office*